(12) United States Patent
Wijnands et al.

(10) Patent No.: US 8,611,346 B1
(45) Date of Patent: Dec. 17, 2013

(54) MULTICAST SPARSE-MODE SOURCE REDUNDANCY

(75) Inventors: IJsbrand Wijnands, Leuven (BE); Najam Saquib, Bad Soden am taunus (DE)

(73) Assignee: Cisco Technology, Inc., San Jose, CA (US)

(*) Notice: Subject to any disclaimer, the term of this patent is extended or adjusted under 35 U.S.C. 154(b) by 573 days.

(21) Appl. No.: 12/818,900

(22) Filed: Jun. 18, 2010

(51) Int. Cl.
H04L 12/28 (2006.01)

(52) U.S. Cl.
USPC .......... 370/390; 370/312; 370/393; 370/401; 713/163; 713/182

(58) Field of Classification Search
USPC .......... 370/225, 252, 390, 328, 386; 713/163, 713/182
See application file for complete search history.

(56) References Cited

U.S. PATENT DOCUMENTS

| | | | |
|---|---|---|---|
| 6,553,028 B1 | 4/2003 | Tang et al. | |
| 6,735,201 B1 | 5/2004 | Mahajan et al. | |
| 6,785,274 B2 | 8/2004 | Mahajan et al. | |
| 6,791,980 B1* | 9/2004 | Li | 370/390 |
| 6,804,236 B1 | 10/2004 | Mahajan et al. | |
| 6,839,348 B2 | 1/2005 | Tang et al. | |
| 6,847,638 B1 | 1/2005 | Wu et al. | |
| 6,989,856 B2 | 1/2006 | Firestone et al. | |
| 7,016,351 B1 | 3/2006 | Farinacci et al. | |
| 7,385,977 B2 | 6/2008 | Wu et al. | |
| 7,418,003 B1 | 8/2008 | Alvarez et al. | |
| 7,421,578 B1 | 9/2008 | Huang et al. | |
| 7,423,986 B2 | 9/2008 | Grayson et al. | |
| 7,477,282 B2 | 1/2009 | Firestone et al. | |
| 7,529,199 B1 | 5/2009 | Wijnands et al. | |
| 7,549,160 B1 | 6/2009 | Podar et al. | |
| 7,599,367 B2 | 10/2009 | Radhakrishnan et al. | |
| 7,644,177 B2 | 1/2010 | Kouvelas et al. | |
| 7,684,316 B2 | 3/2010 | Filsfils et al. | |
| 7,693,146 B2 | 4/2010 | Subramanian | |
| 7,707,240 B2 | 4/2010 | Marascio et al. | |
| 7,716,363 B1 | 5/2010 | Eckert | |
| 7,719,959 B2 | 5/2010 | Shah et al. | |
| 7,720,019 B1 | 5/2010 | Farinacci et al. | |
| 7,742,475 B2 | 6/2010 | Wijnands et al. | |
| 8,125,926 B1* | 2/2012 | Kompella | 370/254 |
| 2003/0165140 A1* | 9/2003 | Tang et al. | 370/393 |
| 2004/0205215 A1* | 10/2004 | Kouvelas et al. | 709/231 |
| 2005/0213525 A1 | 9/2005 | Grayson et al. | |
| 2007/0008966 A1 | 1/2007 | Santhanam et al. | |
| 2007/0064901 A1 | 3/2007 | Baird et al. | |
| 2007/0127473 A1* | 6/2007 | Kessler et al. | 370/390 |
| 2007/0165632 A1 | 7/2007 | Zwiebel | |

(Continued)

*Primary Examiner* — Andrew Chriss
*Assistant Examiner* — Mohamed Kamara
(74) *Attorney, Agent, or Firm* — Novak Druce Connolly Bove + Quigg LLP

(57) ABSTRACT

In one embodiment, a device within a first network may learn a plurality of multicast traffic sources, and may join a first source-specific group for a particular group and a second source-specific group for the particular group. Subsequently, the device may receive multicast traffic from within the first network from at least one of the source-specific groups, select which received traffic to transmit down a non-source-specific shared multicast tree of a second network for the particular group, and transmit the selected traffic down the shared multicast tree for the particular group. In one embodiment, a receiver device in the second network may join the non-source-specific shared multicast tree to receive the traffic for the particular group.

24 Claims, 5 Drawing Sheets

(56) References Cited

U.S. PATENT DOCUMENTS

| | | |
|---|---|---|
| 2007/0177525 A1* | 8/2007 | Wijnands et al. ............. 370/390 |
| 2007/0211722 A1 | 9/2007 | Subramanian |
| 2008/0225850 A1 | 9/2008 | Oran et al. |
| 2008/0267078 A1 | 10/2008 | Farinacci et al. |
| 2008/0310408 A1* | 12/2008 | Thompson et al. ........... 370/386 |
| 2009/0161670 A1 | 6/2009 | Shepherd et al. |
| 2009/0274042 A1* | 11/2009 | Asati et al. ..................... 370/225 |
| 2009/0303902 A1* | 12/2009 | Liu et al. ....................... 370/390 |
| 2010/0226227 A1* | 9/2010 | Yu et al. ..................... 369/53.15 |
| 2011/0141929 A1* | 6/2011 | Razdan et al. ................ 370/252 |

\* cited by examiner

US 8,611,346 B1

MULTICAST SPARSE-MODE SOURCE REDUNDANCY

TECHNICAL FIELD

The present disclosure relates generally to computer networks, and, more particularly, to multicast transmissions in computer networks.

BACKGROUND

Multicast transmissions, such as according to protocol independent multicast (PIM), may be executed over a virtual local area network (LAN). For example, multicast distribution trees (MDTs) may be built in a computer network that allow content (e.g., traffic) from source devices to be replicated by routers within the MDT in order to reach a plurality of receivers. An example multicast transmission may be an internet protocol television (IPTV) channel being multicast from one source server to a plurality of receivers (e.g., users' set-top boxes or computers).

In PIM Sparse-Mode (PIM-SM), the MDT is built toward a root device (rendezvous point or "RP") such that the tree is not specific to any source, i.e., is a shared tree. In PIM-SM, a last-hop router at the end of the shared tree joins each and every learned source of the shared tree, and creates a last step source tree to the receivers for each source. From the receivers' perspective (e.g., client/customer perspective), a receiver application joins the multicast group (*,G), and not the source, and simply receives the traffic sent to it on the source tree from the last-hop router for the particular joined group. One problem with Sparse-Mode is that it is complex to implement, particularly at the last-hop routers, having to build a generic shared tree to an RP, then learn all of the sources, then build source trees to the receivers, and finally switch traffic from shared trees to source trees.

An alternative to Sparse-Mode is PIM Source-Specific Multicast (PIM-SSM), in which source trees are created from the receiver directly to each source. In PIM-SSM, the receivers must learn of the sources in advance, and may then join the source and group (S,G) to receive content from the source on the corresponding source tree. One problem with Source-Specific Multicast, however, is how the receiver application learns about the specific sources, and how to maintain a redundancy relationship in the event the learned source fails. That is, since in PIM-SSM each tree is for a different source, and each traffic stream depends on the S,G pair, then different sources result in different streams. As such, to provide redundancy, two sources would be required, resulting in two source trees, two traffic streams for the content, and the receivers' having to join the two streams. The application to parse the two streams appropriately is complex, and the two (or more) streams in the network requires twice (or more) bandwidth all the way from the sources to the receivers (e.g., set-top boxes, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
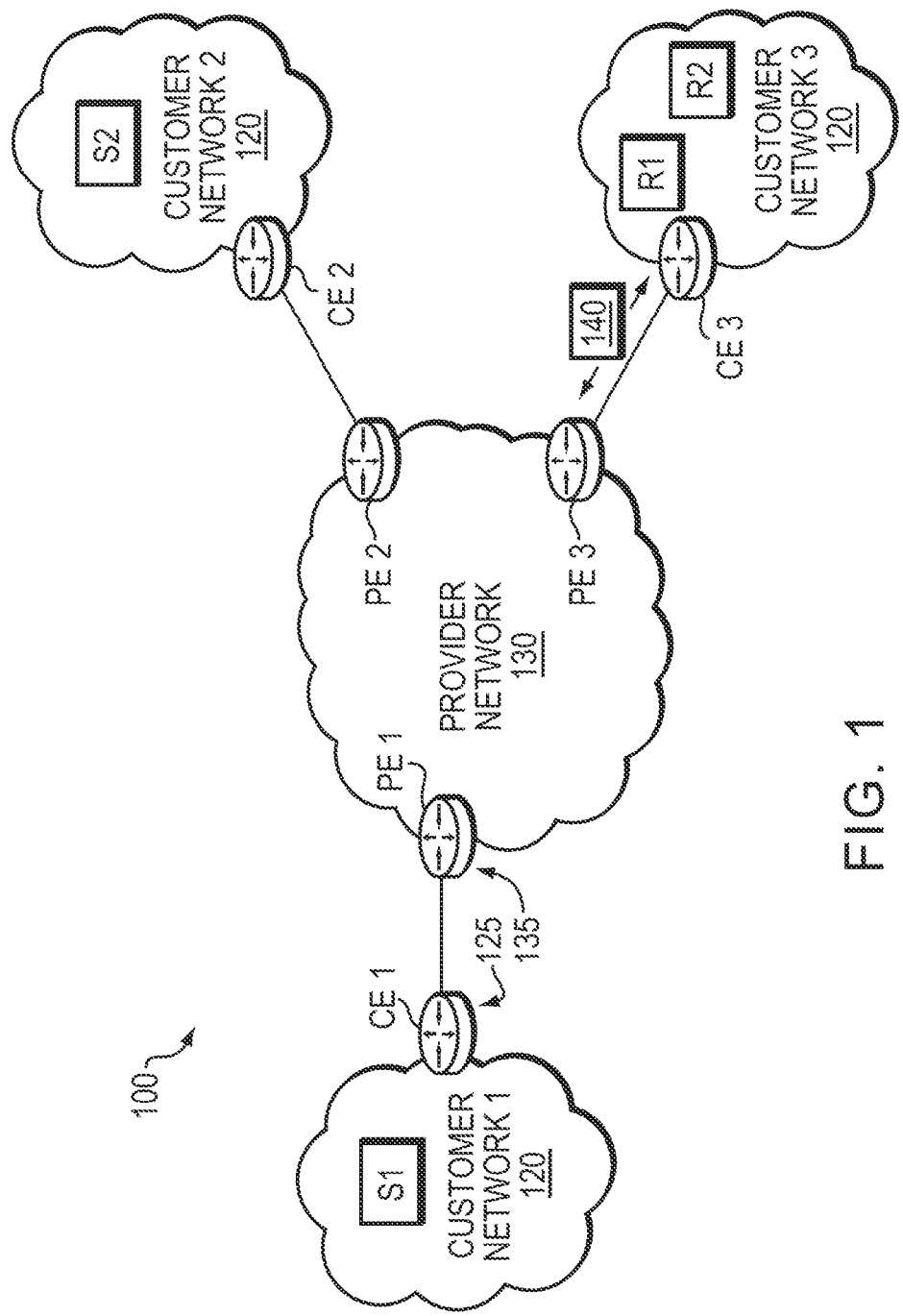
FIG. 1 illustrates an example computer network.

According to one or more embodiments of the disclosure, a device within a first network may learn a plurality of multicast traffic sources, and may join a first source-specific group for a particular group and a second source-specific group for the particular group. Subsequently, the device may receive multicast traffic from within the first network from at least one of the source-specific groups, select which received traffic to transmit down a non-source-specific shared multicast tree of a second network for the particular group, and transmit the selected traffic down the shared multicast tree for the particular group. In one embodiment, a receiver device in the second network may join the non-source-specific shared multicast tree to receive the traffic for the particular group.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as one or more routers interconnecting associated networks/domains as shown. Illustratively, in a typical service provider network, customer networks 120 (e.g., 1-3) may be interconnected by a centralized or "core" provider network 130. In particular, customer edge routers/devices 125 (e.g., "CEs" 1-3) of a corresponding customer network 120 may interconnect with a corresponding provider edge router/device 135 (e.g., "PEs" 1-3) of the provider network 130 in order to provide connectivity and communication between the customer networks. For use in examples herein, source devices "S1" and "S2" (e.g., servers, computers, etc.) are shown within customer networks 1 and 2, respectively, and receiver devices "R1" and "R2" (e.g., set-top boxes, computers, personal computers/PCs, etc.) are shown within customer network 3. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic, messages, etc.) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
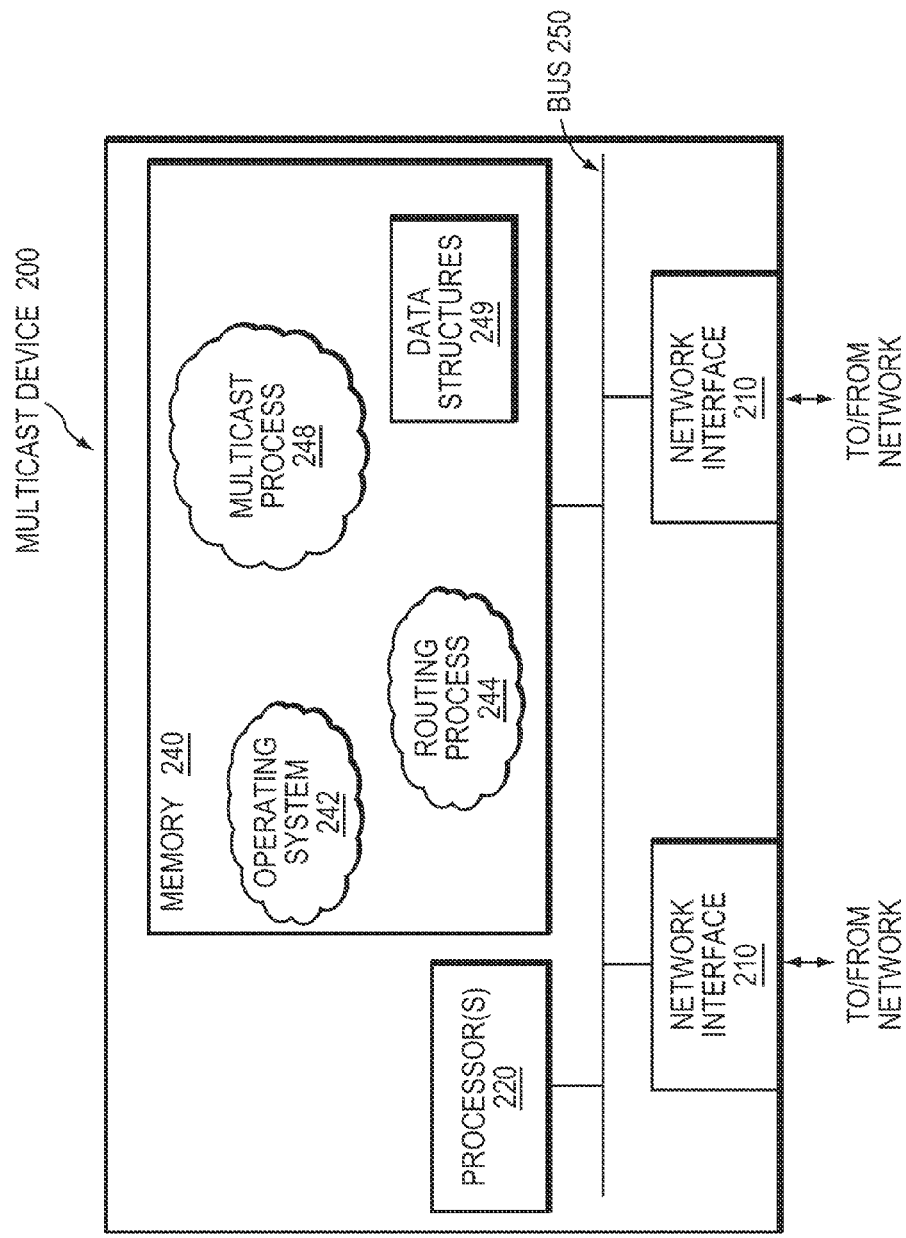
FIG. 2 illustrates an example network device/node.

FIG. 2 is a schematic block diagram of an example node/device 200 that may be used with one or more embodiments described herein, e.g., as a "decision device" as described below, such as a PE 135 (e.g., PE3) or possibly a CE 125 if aptly configured to participate in the techniques described below according to revised protocol practices. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) or Virtual LAN (VLAN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 249. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services/process 244, and multicast services/process 248. It will be apparent to those skilled in the art that other types of processors and memory, including various computer-readable media, may be used to store and execute program instructions pertaining to the techniques described herein.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances, or tunneling protocols, such as for Generic Route Encapsulation (GRE) or Multi-Protocol Label Switching (MPLS), etc., each as will be understood by those skilled in the art.

Multicast services/process 248 contains computer executable instructions executed by processor 220 to perform functions provided by one or more multicast protocols, such as the Protocol Independent Multicast (PIM) protocol or any of its relative protocols as mentioned herein.

Unicast data transfer (e.g., unicast forwarding) involves forwarding a data packet from a single sending process of an end node ("source") to a single receiving process of an end node ("receiver") on the computer network. Often the destination of the data packet issued by a source may be more than one, but less than all of the receivers on the network. This type of multicast data transfer (e.g., multicast forwarding) is typically employed to segregate communication between groups of receivers on the network. IP multicasting, in particular, may be used to disseminate data to a large group of receivers on the network.

To affect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group". These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently. The Internet Group Membership Protocol (IGMP) manages packet communication between hosts and their local multicast router, letting them join or leave groups. That is, IGMP is used to send a group membership message from a host to its directly connected ("last-hop") router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols. IGMP Version 3 (IGMPv3) adds support for "source filtering," i.e., the ability for a system to report interest in receiving packets "only" from specific source addresses (INCLUDE operation), or packets from "all but" specific source addresses (EXCLUDE operation).

Multicast routing protocols construct distribution trees through the network and direct multicast forwarding. The multicast distribution trees (MDTs) define the path that multicast traffic will take through the network to group members. These paths are based on source or shared multicast distribution trees. A multicast distribution tree is shared when any source (host) originating data traffic destined to a group address of a multicast group uses the same distribution tree to forward data to the receivers. In contrast, a source distribution tree is a separate, shortest path tree (SPT) built for each source originating traffic to the multicast group.

In certain IP multicast networks, a single node or router acts as a meeting place for sources and receivers of multicast data. In other words, IP multicast packets from an upstream source and join messages from downstream routers "rendezvous" at this core router, or "Rendezvous Point" (RP). An RP may be configured to know the sources (S) for all multicast groups (G) of the IP multicast network. That is, by using an RP, other routers of the IP multicast networks are not required to know the addresses of the sources or every multicast group, but instead only the address of the RP. When a router (an end point) learns that an interested receiver wishes to join a particular group, the router will attempt to join the group at the RP, not to the actual source of the content. Thus, rather than the "(S,G)" notation above, the RP model utilizes a "(*,G)" notation, in which any source (*) may be used for a given group (G), i.e., multiple sources may source multicast traffic for the same group. An announcement protocol may be used to select and announce rendezvous points to all routers in the network. However, an alternative to using an announcement protocol to automatically advertise rendezvous points to all routers in the network is to manually configure the identity of the rendezvous points on all of the routers. Examples of multicast routing protocols that use a rendezvous point include PIM-Sparse-Mode (PIM-SM) and Bidirectional PIM (BIDIR-PIM) protocols. Other multicast protocols that do not require a rendezvous point include PIM dense mode (PIM-DM) and PIM source-specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. Broadly stated, a router joins a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the hosts (receivers) are egress interfaces. The receivers are leaves or nodes on the distribution tree. Packets are sent from a source to the root (rendezvous point or source itself) of the distribution tree, where they are forwarded towards the branches and out to the nodes that represent the receivers. On each node, packets are received on the ingress interface towards the root of the tree and packets are forwarded out egress interfaces towards the receivers or nodes.

Specifically, a receiver may use IGMP to communicate a request to join a multicast group address to a last-hop router. In response to the request, the receiver may determine a root node of the multicast group, that is, the device responsible for sourcing traffic for the multicast group (S,G) into the network (notably, where the actual "source" of the traffic is located beyond the root node). The receiver may then communicate a "Join" message/request to its neighboring routers (neighbors) on the link towards the rendezvous point (for a shared tree) or source (for an SPT) using a multicast routing protocol, such as PIM. Based on interest in the multicast source-group (S,G) pair, multicast routers in the network may then maintain a state regarding the incoming and outgoing interfaces for each (S, G) pair. The maintained state, e.g., maintained in a multicast routing table, is used to determine which data packets are to be discarded and which are to be forwarded. Illustratively, this multicast routing table may contain, for each (S,G) pair, an address of the multicast group, an address of the corresponding source, the incoming interface, and a list of outgoing interfaces. Collectively, therefore, the routers construct a multicast distribution tree rooted at a rendezvous point or source for that group address and having a branch (link) that "pulls" packets towards the last-hop router. Note that only a single multicast router (forwarder) should forward packets for a route over a specific link of the tree.

As noted above, in PIM Sparse-Mode (PIM-SM), a multicast distribution tree (MDT) is built as a shared tree toward a root device (RP), and is not specific to any source. One problem with Sparse-Mode, however, is that it is complex to implement, particularly at the last-hop routers, having to build a generic shared tree to an RP, then learn all of the sources, then build source trees to the receivers, and finally switch traffic from shared trees to source trees to the receivers. PIM Source-Specific Multicast (PIM-SSM) is an alternative to Sparse-Mode where source trees are created from the receiver directly to each source. In PIM-SSM, the receivers must learn of the sources in advance, and may then join the source and group (S,G) to receive content from the source on the corresponding source tree. One problem with Source-specific Multicast, however, is how the receiver application learns about the specific sources, and how to maintain a redundancy relationship in the event the learned source fails. That is, since in PIM-SSM each tree is for a different source, and each traffic stream depends on the S,G pair, then different sources result in different streams. As such, to provide redundancy, two sources would be required, resulting in two source trees, two traffic streams for the content, and the receivers' having to join the two streams. The application to parse the two streams appropriately is complex, and the two (or more) streams in the network requires twice (or more) bandwidth all the way from the sources to the receivers (e.g., set-top boxes, etc.).

As an example, multicast transmissions may be used by service providers to transport internet protocol television (IPTV) services. For instance, an IPTV channel's content may be multicast from one particular source to a plurality of receivers (e.g., users' set-top boxes or computers), such as from source S1 to receivers R1 and R2. In order to provide redundant sources for the IPTV servers, a service provider may generally be advised to utilize an "Anycast" technique, where two source servers are configured to source content from a shared IP address, and the core network 130 may decide which stream to source to the receivers (e.g., based on a nearest source). For various reasons, however, such as geographically diverse sources, regional channels in same groups with different sources (e.g., for different regional content), or other factors, Anycast techniques may not be preferred by certain service providers. As such, they want to be able to use two sources/servers for the same TV channel, which is problematic when using Sparse-Mode due to the two different sources being seen as different IPTV channels, as well as the two streams being forwarded to the customer causing duplicates.

As stated above, even using PIM-SSM to provide redundancy based on different source addresses is not trivial, since the receiver's application needs to join to both SSM sources in order to pull the traffic down, and must then filter out one stream. Other techniques, such as Multicast only Fast Re-Route (MoFRR), may provide redundancy based on a source having equal cost multipath (ECMP) paths to receivers, where the same source content is pulled down from different paths and only one is forwarded. This technique is limited to equal source addresses, and depends on ECMP paths.

Multicast Sparse-Mode Source Redundancy

According to one or more embodiments of the disclosure, a "decision device" such as a PE (e.g., PE3) within a first network (e.g., provider network 130) may learn a plurality of multicast traffic sources (e.g., S1 and S2), and may join a first source-specific group for a particular group (S1,G) and a second source-specific group for the particular group (S2,G). Subsequently, the device may receive multicast traffic from within the first network from at least one of the source-specific groups, select which received traffic to transmit down a non-source-specific shared multicast tree of a second network (e.g., customer network 3, 120) for the particular group, and transmit the selected traffic down the shared multicast tree for the particular group. In one embodiment, a receiver device in the second network may join the non-source-specific shared multicast tree to receive the traffic for the particular group (*,G).

The techniques herein would thus allow a service provider to provide redundancy for multicast content (e.g., IPTV channels) sourced from different address based on sparse-mode forwarding, such as by making use of the shared tree in PIM-SM for the connection between the decision device (e.g., PE) and the receiver (client/customer) application. Note that while the description herein generally relates to a division of the first and second networks at a PE, this is meant to be an illustrative example, and not meant to limit the scope of the embodiments herein. For instance, the decision could be made at a CE (e.g., CE3), or the divide between first and second networks may simply imply a divide between a first portion of a computer network that uses source-specific multicast trees, and a second portion that uses shared multicast trees.

Illustratively, the techniques described herein may be performed by hardware, software, and/or firmware, such as in accordance with multicast process 248, which may further contain computer executable instructions executed by the processor 220 to perform functions relating to the novel techniques described herein. Specifically, multicast process 248 may be configured on multicast-enabled "decision devices" between a first and second network to operate according to the correspondingly designated techniques described herein, or may be configured on multicast-enabled receiver devices (e.g., receiver applications) to operate according to the respective techniques also described herein.

Operationally, a decision device, such as a PE (e.g., PE3) between the first and second network may learn of multicast traffic sources, such as S1 and S2 of a same group "G." For instance, the PE may learn the sources through a discovery technique, such as utilizing a known multicast source discovery protocol (MSDP), or known BGP "auto-discovery" protocol. Alternatively, the PE may receiving manual entries, or may act as a last-hop router (e.g., a receiver of the multicast group) to learn of the sources via a data path in a conventional manner.

Once the decision device has learned the multicast sources, it may join each source-specific group for a particular group (S*,G), such as joining a first source-specific group (S1,G) for the first source S1 for a particular group, and a second source-specific group (S2,G) for the second source S2 for the same group (e.g., the same IPTV channel). The result of joining the source-specific groups is a set of source-specific trees (or simply "source trees") between the sources and the decision device. In addition, in accordance with one or more embodiments herein, a receiver device (or application), such as R1 or R2, may join the particular group as a non-source-specific group (*,G), and may interconnect with the decision device over a non-source-specific tree (or simply a "shared tree").

Figure 3:
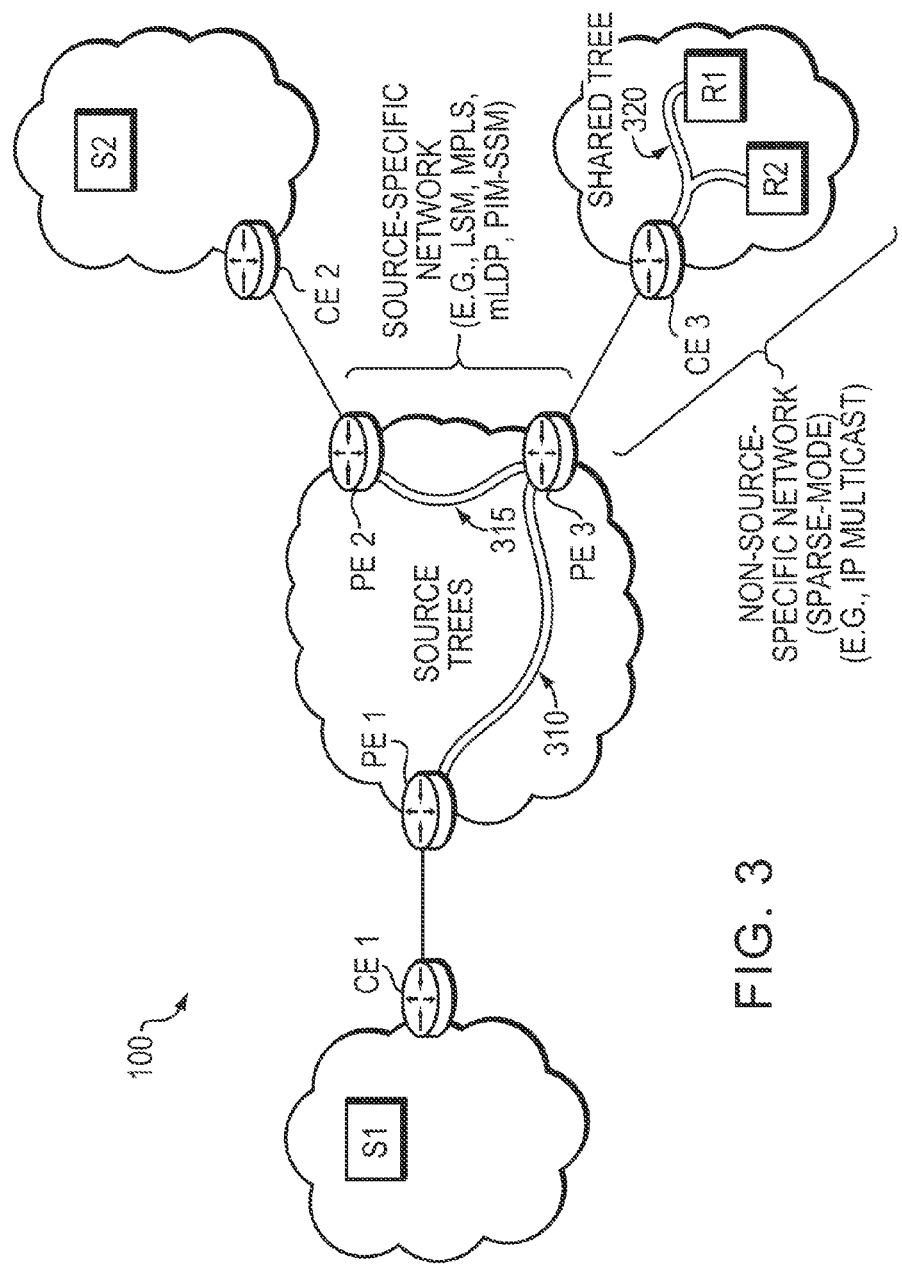
FIG. 3 illustrates an example computer network with multicast trees.

FIG. 3 illustrates the example computer network 100 of FIG. 1 with multicast distribution trees in accordance with one or more embodiments herein. For instance, the decision device PE3 may be interconnected to the source S1 via a source tree 310 (illustratively maintained within the provider network 130, and not continuing to the customer network 125; one example embodiment), while also being interconnected to the source S2 via a second source tree 315. Further, the receivers R1 and R2 may be interconnected to a root device (RP), namely PE3, for a particular multicast group (*,G) based on a shared tree 320. In this manner, the computer network 100 is effectively divided by the decision device into a first, source-specific network, and a second, non-source-specific network (e.g., a Sparse-Mode network).

Illustratively, the receiver application may join the multicast group via a conventional PIM Sparse-Mode operation to the PE (e.g., R1 to PE3), resulting in a sparse-mode, shared, non-source-specific (*,G) multicast tree 320 (e.g., IP multicast). Typically, joining a Sparse-Mode group implies that all source transmitting content to the group should be forwarded to this receiver. However, according to the one or more embodiments herein regarding the divided first and second networks, this model is modified such that only one source is forwarded down the shared tree at a time, while any other sources are blocked (dropped, discarded, ignored, etc.).

Notably, in an illustrative example, the core provider network operates utilizing label switched multicast (LSM) trees 310/315, such as via MPLS and a multicast Label Distribution Protocol (mLDP), e.g., using point-to-multipoint or P2MP tunnels within the core network 130 specifically configured to transport multicast traffic, such that no "native" multicast traffic is received by the PE. Also, from the PE to the receiver devices R1/R2, an IP multicast shared tree (e.g., or specifically a PIM Sparse-Mode tree) 320 may be used. Also, the core/first network may alternatively be based on PIM source-specific mode (PIM-SSM) trees 310/315.

With both the decision device (PE3) and at least one receiver (e.g., R1) having joined the multicast group in their respective manners, the decision device may begin receiving multicast traffic (from within the first network) from at least one of the source-specific groups (S*,G) (on trees 310/315), and may then select which received traffic to transmit down the shared tree 320 for the particular group.

Figure 4:
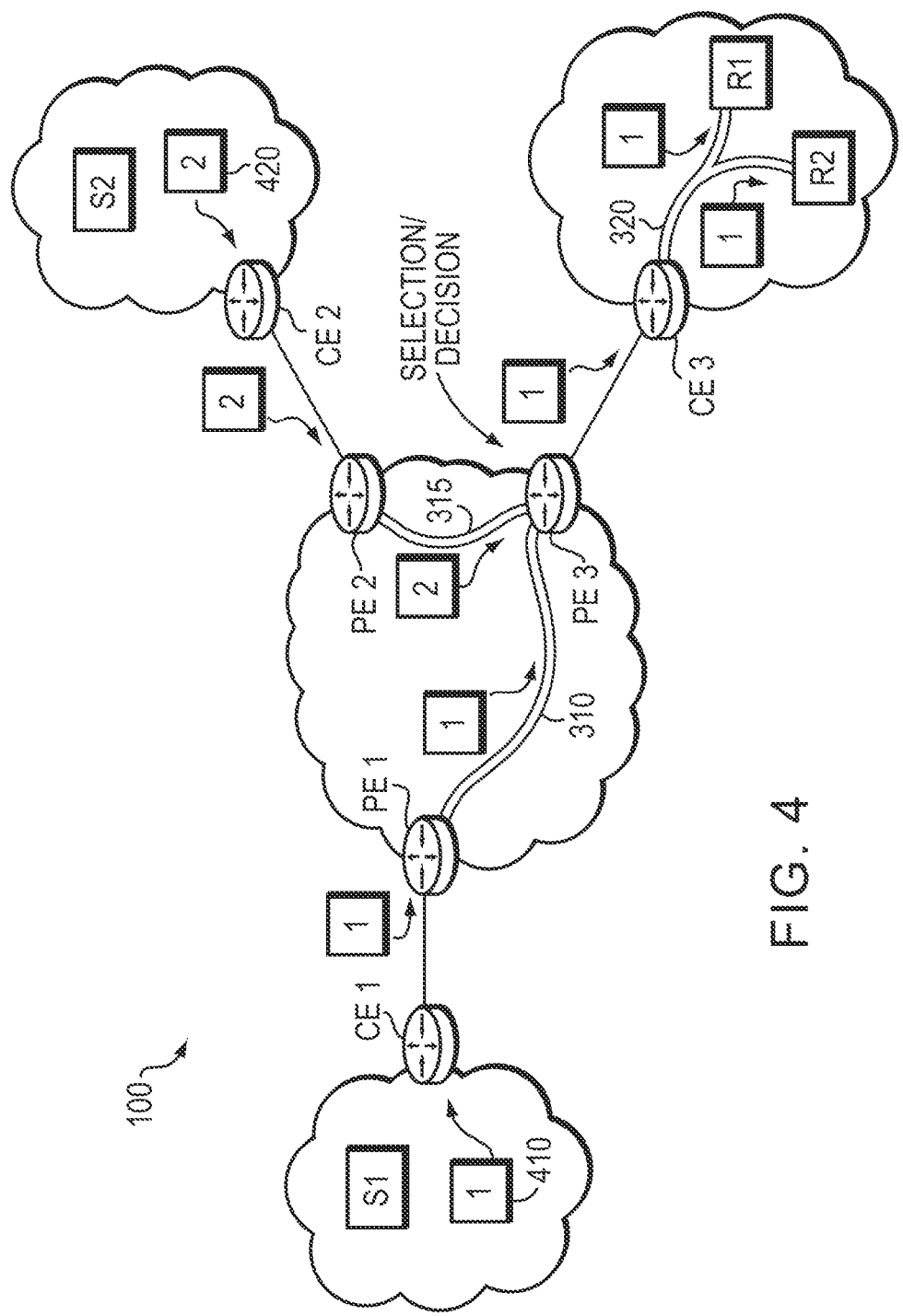
FIG. 4 illustrates an example computer network with multicast traffic.

FIG. 4 illustrates the example network 100 of FIG. 3 showing sourced multicast traffic. In particular, from a first source S1 for the multicast group G, a first stream 410 (S1,G) traverses the first source tree 310 to the decision device PE3. Also, a second stream 420 from the second source S2 for the multicast group G (S2,G) traverses the second source tree 315 to the decision device PE3. Upon receipt of either of the two streams the decision device PE3 may then decide which particular stream to transmit onto the shared tree 320 for the particular multicast group.

The selection of which received traffic to transmit down the non-source-specific shared multicast tree (of the second network) for the particular group may be based on a number of factors. For example, selection from candidate sources may be made based on unicast routing based decisions to the respective sources (e.g., reachability, cost/distance, other metrics, etc.). For instance, using label switched multicast (LSM) techniques, mLDP can be used to perform the selection logic and only feed in one P2MP LSP at a time based on the reachability to the source; i.e., if the current source is not reachable anymore, move to a next best source. Similarly, "liveliness" of the data received on the individual trees may be used, such that where a source is still deemed reachable, if one stream ceases for some reason while another continues, the continuing stream may be selected for transmission.

Other "stream-based" factors may be used to make the selection, such as determining a best packet rate (e.g., gaps between packets) or bit rate (e.g., Media Rate Variation or "MRV") between the received traffic streams of both the first and second source-specific groups. In this manner, the stream with the best packet or bit rate may then be selected as the traffic to transmit down the shared tree.

Additionally, "packet-based" factors may also be used to select a particular packet to transmit to the shared tree 320. For example, based on packets being identifiable in order, e.g., sequenced (such as with unique sequence numbers), a first received packet of a particular sequence may be transmitted to the shared tree, regardless of which stream/source originated the packet, thus allowing for zero packet loss where at least one of the duplicate packets reaches the decision device. That is, the decision device may determine a particularly sequenced packet within a sequence of packets that is received first at the device, and may select the first received particularly sequenced packet as the traffic to transmit down the non-source-specific shared multicast tree for the particular group. For example, assume, simplistically, that a sequence of packets consists of packet 1, 2, 3, 4, and 5. Each of these packets should be sent from each of the sources, e.g., S1 and S2, in that order. Assume further that PE3 receives packets 1, 2, and 3 from S1 prior to receiving respective packets 1, 2, and 3 from S2. PE3 may then transmit packets 1, 2, and 3 from S1's stream 315/410 onto the shared tree 320 for the group. Now, if packet 4 is received from S2 prior to its receipt from S1, then PE3 may simply decide to transmit the received packet 4 (from S2) to the shared tree. Packet 5 may then be received from S1 first, and then PE3 switches back to S1's stream, at least for that particular packet.

Notably, the above example assumes that a decision is made on a packet-per-packet basis. However, it may be beneficial to select a primary stream, such that so long as a sequenced packet is received within a certain amount of time from the primary stream, then that primary stream is still used. This prevents too many decisions and possibly constant switching between the primary and secondary streams. For example, assuming the sequence of events above, it may be possible that a duplicate packet 4 was simply never received at PE3 from the first source S1, in which case packet 4 was used from the second source S2. Then rather than make a complete switch to S2's stream, PE3 merely returned to S1 for packet 5 as a primary stream. If, however, packet 4 was eventually received from source S1 (e.g., within a specified or buffered time period), then the packet 4 from source S1 may be used, accordingly. Other example arrangements may be made, and the illustrations herein are merely representative and not meant to limit the scope of the embodiments herein.

Once the decision device PE3 has selected particular traffic (e.g., stream-based, packet-based, etc.), the decision device may then transmit the selected traffic down the shared multicast tree 320 for the particular group. Any interested receivers (e.g., R1 and/or R2) that have joined the group (*,G) on the shared tree may then receive the traffic, regardless of the actual initial source. That is, since the final leg of the multicast transmission is a shared tree, it does not matter which source initiated the content since all traffic for the particular group is received on the shared tree by the receiver applications. In this manner, the sources may be alternated, backed up, failure-protected, etc., without the receiver applications being aware of the different sources of the multicast group.

Note that the decision device may join both the first and second source-specific-group streams at the same time (e.g., mLDP joining both P2MP LSPs at the same time), as described above. In this manner, regardless of whether the selection is stream-based or packet-based, convergence is faster, since the two streams may already be received at the decision device, and thus a new tree need not be built and joined before receiving missing content. Alternatively, however, in one or more additional embodiments the second source-specific group may be joined (e.g., its corresponding source tree 315 built) on-demand. For instance, in response to determining that the first source-specific group has failed (i.e., the content cannot reach the decision device), or that the decision device is no longer receiving content for the multicast group for other reasons, the decision device may then, in response, join the second source-specific group for the particular group on-demand. As such, duplicate bandwidth within the first (e.g., provider) network is essentially eliminated, but at the cost of a potentially slower failure recovery (e.g., having to build and join a source tree, as opposed to simply switching to an already received stream in progress, as above).

Figure 5:
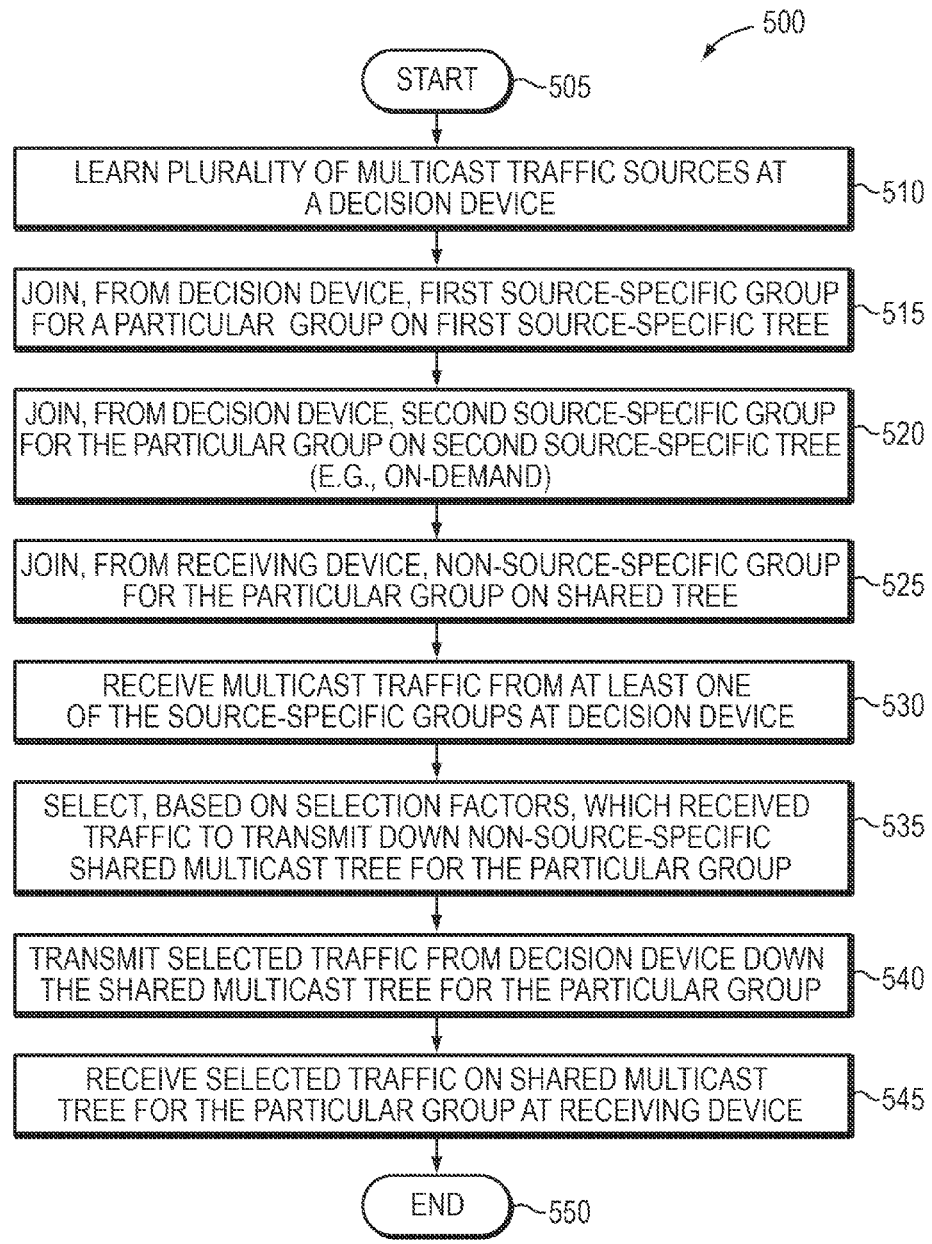
FIG. 5 illustrates an example procedure for multicast Sparse-Mode source redundancy.

FIG. 5 illustrates a simplified example procedure for multicast Sparse-Mode source redundancy in accordance with one or more embodiments described herein. The procedure 500 starts at step 505, and continues to step 510, where a decision device, such as a PE (e.g., PE3) may learn of a plurality of multicast traffic sources, particularly one or more for a particular multicast group to provide source redundancy for that group. In step 515, the decision device may join a first source-specific group (S,G) for the particular group on a first source-specific tree 310, e.g., to source S1, and then in step 520 may also join a second source-specific group for the particular group on a second source-specific tree 315, e.g., to source S2. Notably, as described above, step 520 may occur on a preemptive basis, or on-demand, such as in response to a communication failure with source S1.

In step 525, a receiving device (e.g., R1) may join a non-source-specific group (*,G) for the particular group on a shared tree 320. Upon receiving multicast traffic (410/420) from at least one of the source-specific groups at the decision device in step 530, the decision device may select, in step 535 based on selection factors described above, which received traffic stream to transmit down the non-source-specific shared multicast tree for the particular group. For instance, as noted above, the first stream 410 may be selected first, unless a problem occurs with the first stream, at which time traffic from the second stream 420 may instead be selected. In step 540 the selected traffic may be transmitted from the decision device down the shared multicast tree 320 for the particular group, and it may be received in step 545 by the receiving device (e.g., R1) accordingly. The procedure ends in step 550, notably with the understanding that traffic may continue to be received, selected, and transmitted by the decision device, and received by the receiving device, until the receiving device no longer desires to receive the group's traffic, or until other factors cease the operation of the procedure 500.

The novel techniques described herein provide for multicast Sparse-Mode source redundancy in a computer network. By modifying PIM-SM to allow one source at a time to reach the receiver, while allowing redundant streams with different source addresses to reach the decision devices (e.g., PEs), the novel techniques effectively allow a multicast group (*,G) to become the identifier of the content (e.g., the IPTV channel) which is independent from the source. In particular, the techniques described above allow content (e.g., IPTV channels) with different source addresses to be used as redundant streams, such as using mLDP LSPs to feed in one P2MP LSP at the time to provide redundancy, thus without burdening the receiver applications or over-utilizing bandwidth near the receivers. Notably, this is not possible if the application uses PIM-SSM. Further, according to the techniques above, it is not necessary to deploy Anycast addresses for the sources, nor is it necessary to depend on Equal Cost Multi-Path (ECMP) paths to provide a known "Live-Live" model, since different source IP addresses may be used.

While there have been shown and described illustrative embodiments that provide for multicast Sparse-Mode source redundancy in a computer network, it is to be understood that various other adaptations and modifications may be made within the spirit and scope of the embodiments herein. For example, the embodiments have been shown and described herein for specific use with PIM-based multicast networks. However, the embodiments in their broader sense are not so limited, and may, in fact, be used with other suitable multicast protocols or future versions of the PIM protocol, such as other multicast protocols that operate in a similar manner and have a similarly-styled "Sparse-Mode." In addition, while the decision devices are shown primarily as PE devices of a provider network, this is merely an illustrative embodiment, and other types of multicast-enabled devices and multicast networks may use the techniques herein, e.g., as mentioned above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   learning a plurality of multicast traffic sources at a device within a first network;
   joining, from the device, a first source-specific group for a particular group;
   joining, from the device, a second source-specific group for the particular group;
   receiving, at the device, multicast traffic from within the first network from at least one of the source-specific groups;
   selecting received traffic from only one of either the first source-specific group or the second source-specific group to transmit down a non-source-specific shared multicast tree of a second network for the particular group; and
   transmitting the selected traffic from the device down the non-source-specific shared multicast tree for the particular group.

2. The method as in claim 1, wherein transmitting further comprises:
   transmitting the selected traffic to a receiver on the non-source-specific shared multicast tree that has joined the particular group as a non-source-specific group.

3. The method as in claim 1, wherein the non-source-specific shared multicast tree is a protocol independent multicast sparse-mode (PIM-SM) tree.

4. The method as in claim 1, wherein the non-source-specific shared multicast tree is an internet protocol (IP) multicast tree.

5. The method as in claim 1, wherein receiving multicast traffic from within the first network further comprises:
   receiving the traffic on a source-specific multicast tree comprising a label switched multicast (LSM) tree.

6. The method as in claim 1, wherein receiving multicast traffic from within the first network further comprises:
   receiving the traffic on a source-specific multicast tree comprising a protocol independent multicast source-specific mode (PIM-SSM) tree.

7. The method as in claim 1, wherein learning the plurality of multicast traffic sources further comprises:
   learning the plurality of multicast traffic sources through a discovery technique selected from a group consisting of: utilizing a multicast source discovery protocol (MSDP), utilizing a border gateway protocol (BGP) auto-discovery protocol, receiving manual entries, and acting as a last-hop router to learn of the sources via a data path.

8. The method as in claim 1, wherein selecting received traffic from only one of either the first source-specific group or the second source-specific group to transmit down the non-source-specific shared multicast tree of the second network for the particular group is based on unicast routing to the sources of the first and second source-specific groups.

9. The method as in claim 1, wherein selecting received traffic from only one of either the first source-specific group or the second source-specific group to transmit down the non-source-specific shared multicast tree of the second network for the particular group further comprises:
   determining a reachable source; and
   selecting traffic from the reachable source as the traffic to transmit down the non-source-specific shared multicast tree of the second network for the particular group.

10. The method as in claim 1, wherein selecting received traffic from only one of either the first source-specific group or the second source-specific group to transmit down the non-source-specific shared multicast tree of the second network for the particular group further comprises:
    determining a particularly sequenced packet within a sequence of packets that is received first at the device; and
    selecting the first received particularly sequenced packet as the traffic to transmit down the non-source-specific shared multicast tree of the second network for the particular group.

11. The method as in claim 10, wherein a duplicate particularly sequenced packet is not received at the device.

12. The method as in claim 1, wherein selecting received traffic from only one of either the first source-specific group or the second source-specific group to transmit down the non-source-specific shared multicast tree of the second network for the particular group further comprises:
  receiving traffic from both the first and second source-specific groups;
  determining a best bit rate between the received traffic from both the first and second source-specific groups; and
  selecting traffic from the first source-specific group or traffic from the second source-specific group having the best bit rate as the selected traffic to transmit down the non-source-specific shared multicast tree of the second network for the particular group.

13. The method as in claim 1, wherein selecting received traffic from only one of either the first source-specific group or the second source-specific group to transmit down the non-source-specific shared multicast tree of the second network for the particular group further comprises:
  receiving traffic from both the first and second source-specific groups;
  determining a best packet rate between the received traffic from both the first and second source-specific groups; and
  selecting traffic from the first source-specific group or traffic from the second source-specific group having the best packet rate as the selected traffic to transmit down the non-source-specific shared multicast tree of the second network for the particular group.

14. The method as in claim 1, further comprising:
  joining the second source-specific group for the particular group on-demand.

15. The method as in claim 14, further comprising:
  determining that the first source-specific group has failed; and
  joining the second source-specific group for the particular group on-demand in response to determining that the first source-specific group has failed.

16. The method as in claim 1, wherein the device is a provider edge (PE) device of a service provider network, the first network is the service provider network, and the second network is a customer network.

17. A non-transitory computer-readable media having software encoded thereon, the software, when executed on a device within a first network, configured to:
  learn a plurality of multicast traffic sources;
  join a first source-specific group for a particular group;
  join a second source-specific group for the particular group;
  receive multicast traffic from within the first network from at least one of the source-specific groups;
  select received traffic from only one of either the first source-specific group or the second source-specific group to transmit down a non-source-specific shared multicast tree of a second network for the particular group; and
  transmit the selected traffic down the non-source-specific shared multicast tree for the particular group.

18. The non-transitory computer-readable media as in claim 17, wherein the non-source-specific shared multicast tree is selected from a protocol independent multicast sparse-mode (PIM-SM) tree and an internet protocol (IP) multicast tree, and wherein the traffic is received on a source-specific multicast tree selected from a label switched multicast (LSM) tree and a protocol independent multicast source-specific mode (PIM-SSM) tree.

19. The non-transitory computer-readable media as in claim 17, wherein the software, when executed, is further configured to select received traffic from only one of either the first source-specific group or the second source-specific group to transmit down the non-source-specific shared multicast tree of the second network for the particular group based on at least one factor selected from a group consisting of: unicast routing to the sources of the first and second source-specific groups; reachability of the sources of the first and second source-specific groups; first receipt of a particularly sequenced packet within a sequence of packets from at least one of the first and second source-specific groups; a best bit rate between received traffic of both the first and second source-specific groups; and a best packet rate between received traffic of both the first and second source-specific groups.

20. The non-transitory computer-readable media as in claim 17, wherein the software, when executed, is further configured to join the second source-specific group for the particular group on-demand.

21. An apparatus, comprising:
  one or more first network interfaces configured to communicate on a first network;
  one or more second network interfaces configured to communicate on a second network;
  a processor coupled to the first and second network interfaces and configured to execute one or more processes; and
  a memory configured to store a process executable by the processor, the process, when executed, configured to:
    learn a plurality of multicast traffic sources;
    join a first source-specific group for a particular group;
    join a second source-specific group for the particular group;
    receive multicast traffic from within the first network from at least one of the source-specific groups;
    select received traffic from only one of either the first source-specific group or the second source-specific group to transmit down a non-source-specific shared multicast tree of the second network for the particular group; and
    transmit the selected traffic down the non-source-specific shared multicast tree for the particular group.

22. The apparatus as in claim 21, wherein the non-source-specific shared multicast tree is selected from a protocol independent multicast sparse-mode (PIM-SM) tree and an internet protocol (IP) multicast tree, and wherein the traffic is received on a source-specific multicast tree selected from a label switched multicast (LSM) tree and a protocol independent multicast source-specific mode (PIM-SSM) tree.

23. The apparatus as in claim 21, wherein the process, when executed, is further configured to select received traffic from only one of either the first source-specific group or the second source-specific group to transmit down the non-source-specific shared multicast tree of the second network for the particular group based on at least one factor selected from a group consisting of: unicast routing to the sources of the first and second source-specific groups; reachability of the sources of the first and second source-specific groups; first receipt of a particularly sequenced packet within a sequence of packets from at least one of the first and second source-specific groups; a best bit rate between received traffic of both the first and second source-specific groups; and a best packet rate between received traffic of both the first and second source-specific groups.

24. The apparatus as in claim 21, wherein the process, when executed, is further configured to join the second source-specific group for the particular group on-demand.

* * * * *